R. B. MILES.
SOLDERING IRON.
APPLICATION FILED JULY 21, 1915.
1,172,545.
Patented Feb. 22, 1916.
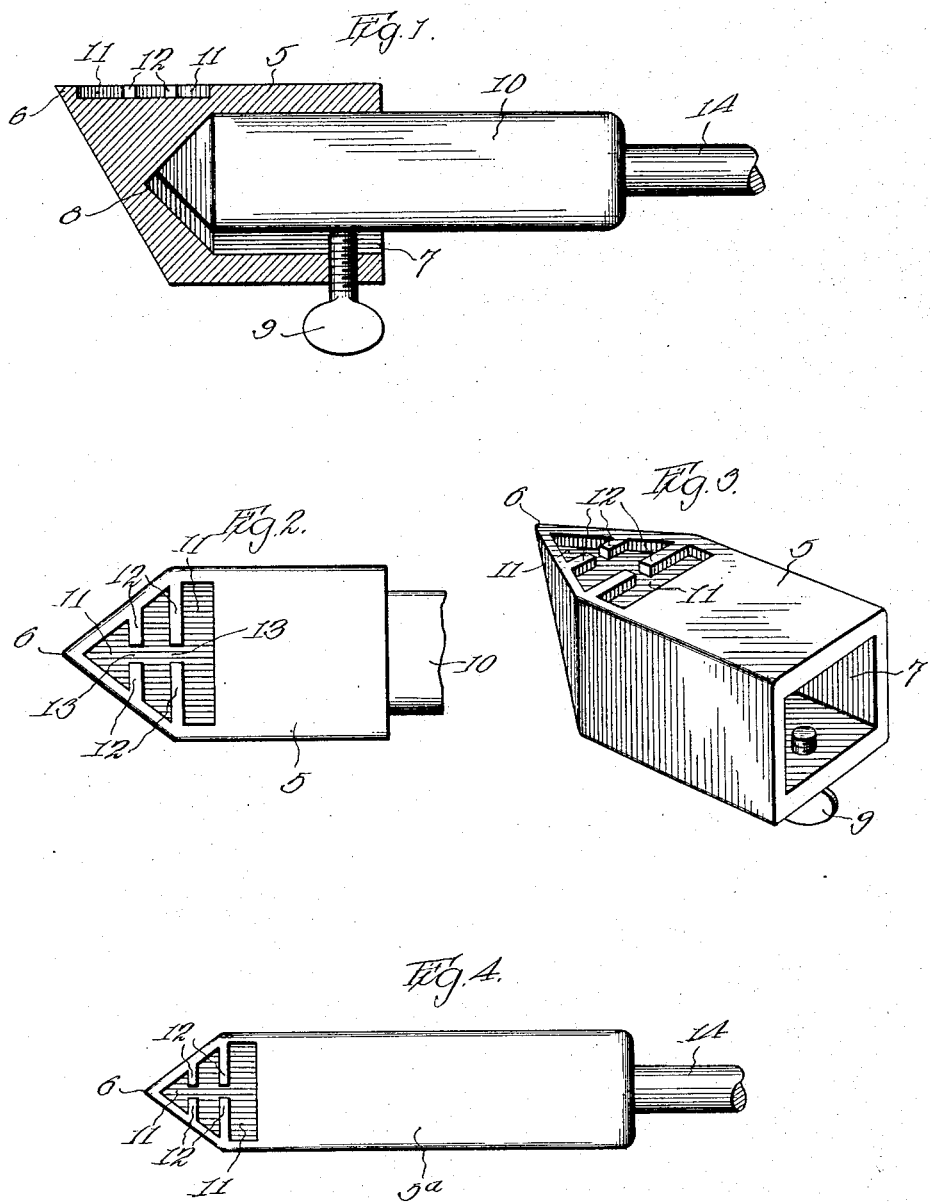

UNITED STATES PATENT OFFICE.

RICHARD B. MILES, OF CHICAGO, ILLINOIS.

SOLDERING-IRON.

1,172,545.  Specification of Letters Patent.  Patented Feb. 22, 1916.

Application filed July 21, 1915. Serial No. 41,055.

*To all whom it may concern:*

Be it known that I, RICHARD B. MILES, a citizen of the United States, residing at Chicago, in the county of Cook and State of Illinois, have invented certain new and useful Improvements in Soldering-Irons, of which the following is a specification.

This invention relates to improvements in soldering-irons, and it consists in certain peculiarities of the construction novel arrangement and operation of the parts thereof, as will be hereinafter more fully set forth and specifically claimed.

The principal object of the invention is to provide a soldering iron which is especially adapted for what is termed "underneath work", yet is applicable for use in the performance of the ordinary or any kind of work requiring the employment of a soldering iron, which shall be simple, and inexpensive in construction, strong, durable and efficient in operation, and so made that if desired it can be used as an attachment for the old style soldering irons, or those of the ordinary and well known type, or my improvements may be embodied in the form of a regular or solid iron.

Another important object of the invention is to so construct the iron, that it will so hold the solder and a sufficient quantity thereof as to enable the user to more readily apply it to the parts to be soldered from underneath, for example, in such work as is performed by electricians and automobile mechanics, and so that a larger number of connections or parts can be soldered from one supply of solder, than by the use of the old style irons.

Various other objects and advantages of the invention will be disclosed in the subjoined description and explanation.

In the accompanying drawing which serves to illustrate my invention, Figure 1 is a view partly in section and partly in elevation showing my improved soldering iron secured in position on a soldering iron of the ordinary type, and adapted to be used as an attachment therefor. Fig. 2 is a plan view of the improved iron and a portion of the old style iron on which it is mounted. Fig. 3 is a perspective view of an iron embodying my improvements and Fig. 4 is a plan view showing a modification in the construction thereof.

Like numerals of reference refer to corresponding parts throughout the different views of the drawings.

Referring now to Figs. 1 to 3 inclusive, the reference numeral 5 designates my improved iron, which may be made of any suitable size and of the material usually employed for soldering irons. The iron 5, is by preference, mainly rectangular in shape as shown, but has its front portion beveled or tapered to a point 6 located at the upper front end of the iron or body. As shown in the figures above referred to, the iron 5 is provided with a cavity 7 which extends from the rear end of the iron forwardly and has its front portion tapered or beveled to a point as at 8, (see Fig. 1 of the drawing). In its lower portion the iron 5 is provided near its rear end with a thumb or setscrew 9 to be used for fastening the iron 5, when the same is used as an attachment, to a soldering iron 10 of the ordinary or any well known construction, which latter iron is inserted in the cavity 7 of the iron 5 until its tapered end contacts with the tapered portion of the cavity 7, when it is obvious that by turning the screw 9, the irons 5 and 10 will be securely secured together for use. The upper surface of the iron 5 is substantially flat as shown, and is provided in its front portion with a cavity 11 for the reception of solder which cavity is transversely divided by partitions 12 which extend transversely with respect to the iron 5 and each of said partitions is cut away at about its middle so as to form gaps 13 through which the solder may pass while in a molten state from the rearmost, and intermediate compartments into the front or angular compartment of the cavity 11 or vice versa. By forming the front compartment of the cavity 11 angular with its apex presented toward the point 6 of the iron, it is obvious that by raising the rear portion of the iron slightly, solder may be supplied to the point 6 from said compartment, to the end, that the solder may be efficiently, neatly and readily applied to the connection or part to be soldered, and especially if the work is to be done from underneath.

In Fig. 4 of the drawing is shown a modification in the construction of the iron which consists in making the body 5ᵃ thereof solid instead of hollow as in the other construction, and securing to the rear end of the body 5ᵃ a handle 14 of any suitable material and construction. In this modified form, the construction of the iron is similar to that above described with the exception that the body is by preference, made longer, and as before stated the cavity is omitted.

From the foregoing and by reference to the drawing it will be readily understood and clearly seen that an iron constructed according to my invention, will be found highly practical and advantageous for the use of electricians, automobile mechanics, tinners and plumbers, in fact by any one, for work or repairs on heavy or stationary articles which cannot be turned over so that the soldering can be done from above, or on those articles or portions thereof to be soldered, which by reason of their location can only be reached, without removal, for repairs from underneath, such as, cornices, gutters, pipes, radiators and other parts of automobiles, as well as, the lead-work and the like of plumbers, and electrical wires and fixtures. It will also be understood that by using my iron as an attachment for an iron of the old style, the heat retaining capacity thereof will be greatly increased or augmented, thus rendering it unnecessary to re-heat it as frequently as is usually necessary.

Having thus fully described my invention, what I claim as new and desire to secure by Letters Patent is—

1. A soldering-iron consisting of a block or body having an angular cavity in its upper surface and its front end tapered, one of the angles of said cavity being presented toward the tapered end of the block and said cavity being divided into communicating compartments.

2. A soldering-iron consisting of a block or body having a cavity extended longitudinally therein from its rear end and having its front end tapered, said block or body having on its upper surface an angular cavity, one of said angles of said cavity being presented toward the tapered end of the block, and means extended into the first named cavity for securing the block or body to a support.

3. A soldering-iron consisting of a block or body having a cavity extended longitudinally therein from its rear end, said block or body having in its upper surface an angular cavity, one of said angles of said cavity being presented toward the tapered end of the block, means extended into the first named cavity for securing the block or body to a support.

4. A soldering-iron consisting of a block or body having a cavity extended longitudinally therein from its rear end, said block or body having its front end tapered to a point substantially in a plane with the upper surface of said block or body, the said block or body having in its upper surface an angular cavity, and means extended into the first named cavity for securing the block or body to a support.

RICHARD B. MILES.

Witnesses:
CHAS. C. TILLMAN,
A. E. OLSON.

Copies of this patent may be obtained for five cents each, by addressing the "Commissioner of Patents, Washington, D. C."